United States Patent
Bennett et al.

(10) Patent No.: US 12,147,354 B2
(45) Date of Patent: Nov. 19, 2024

(54) METHODS AND SYSTEMS FOR PROCESSOR AGNOSTIC ENCRYPTION MANAGEMENT

(71) Applicant: Dell Products L.P., Round Rock, TX (US)

(72) Inventors: Michael Andrew Bennett, Austin, TX (US); Shyamkumar T. Iyer, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 287 days.

(21) Appl. No.: 17/729,706

(22) Filed: Apr. 26, 2022

(65) Prior Publication Data

US 2023/0342306 A1 Oct. 26, 2023

(51) Int. Cl.
*G06F 12/14* (2006.01)

(52) U.S. Cl.
CPC ...... *G06F 12/1408* (2013.01); *G06F 12/1441* (2013.01); *G06F 12/145* (2013.01); *G06F 12/1475* (2013.01)

(58) Field of Classification Search
CPC ............. G06F 12/1408; G06F 12/1441; G06F 12/145; G06F 12/1475; G06F 2212/1052
USPC ........................................................ 726/26
See application file for complete search history.

(56) References Cited

U.S. PATENT DOCUMENTS

| | | | |
|---|---|---|---|
| 9,607,177 B2* | 3/2017 | Jejurikar | H04L 9/08 |
| 2017/0201503 A1* | 7/2017 | Jayasena | H04L 63/0876 |
| 2019/0394021 A1* | 12/2019 | Awad | G06F 21/602 |
| 2020/0192825 A1* | 6/2020 | Ng | G06F 12/1009 |

* cited by examiner

*Primary Examiner* — Jacob Lipman
(74) *Attorney, Agent, or Firm* — Chamberlain, Hrdlicka, White, Williams & Aughtry; Aly Dossa

(57) ABSTRACT

A method for securing memory via an external memory controller, that includes receiving, by the external memory controller, an allocation request to allocate a memory region from a processor core, and in response to receiving the allocation request, allocating the memory region from the memory, associating the processor core with the memory region, and associating an encryption key and a decryption key with the memory region.

20 Claims, 4 Drawing Sheets

METHODS AND SYSTEMS FOR PROCESSOR AGNOSTIC ENCRYPTION MANAGEMENT

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

DETAILED DESCRIPTION

Figure 1:
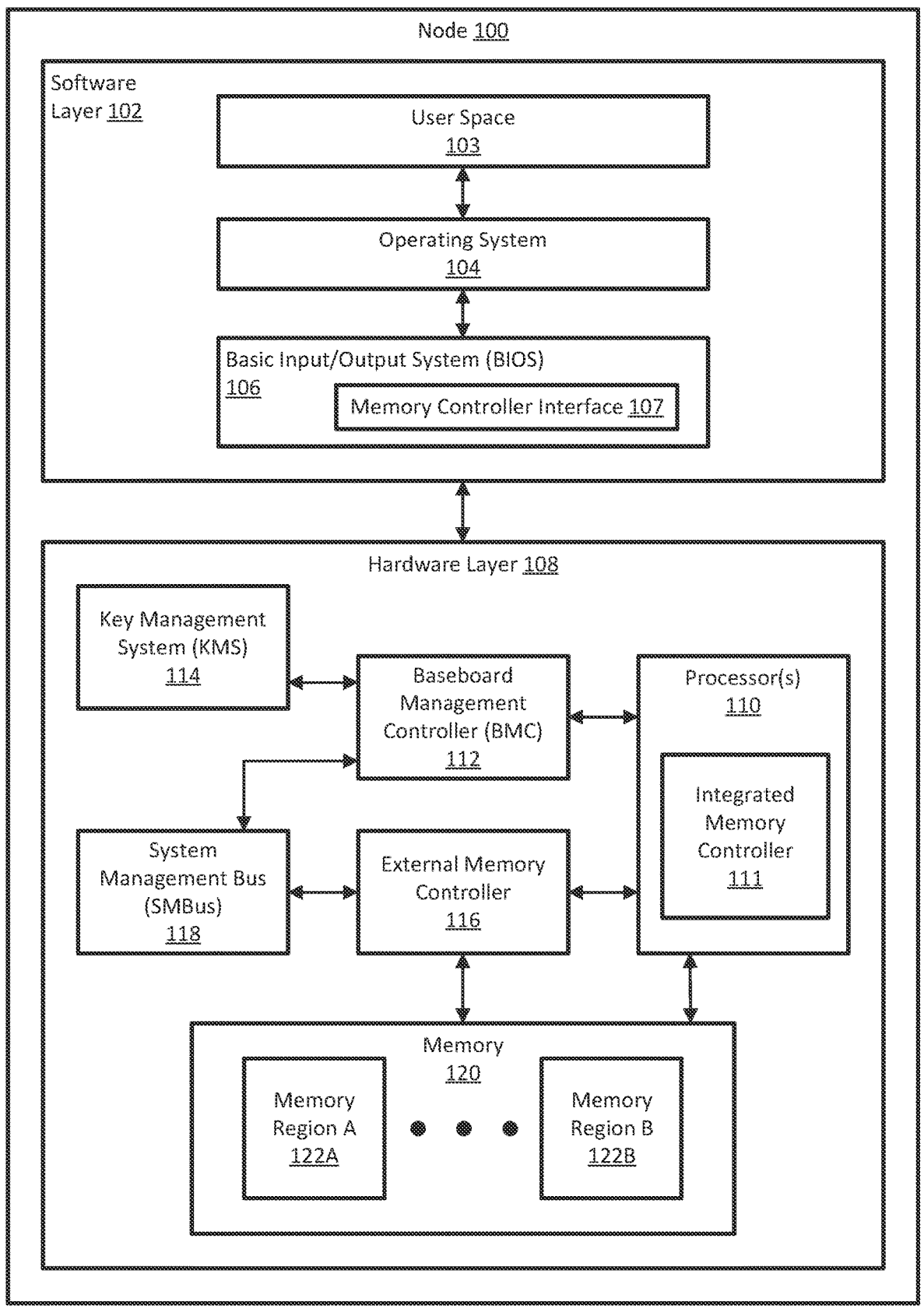
FIG. 1 shows a diagram of node, in accordance with one or more embodiments of the invention.

In general, embodiments of the invention relate to systems and methods for securely encrypting and decrypting memory (e.g., regions of memory) using a memory controller that is external to the processor (i.e., an "external memory controller"). In conventional systems, a memory controller that is integrated into a processor (i.e., an "integrated memory controller") provides several benefits. The integrated memory controller may be impractical to separate from the processor due to their concurrent construction and entangled circuitry within a single integrated circuit. Further, additional configuration of the external memory controller is avoided as the processor and integrated memory controller are designed and preprogrammed to function in tandem. Accordingly, utilizing the integrated memory controller for encryption and decryption of data in memory may be securely and easily achieved.

However, an integrated memory controller may be built to include only a finite number of encryption keys. Further, in order to configure the integrated memory controller (e.g., to "rekey" it), the processor may not utilize a common, known, or open protocol, but instead may utilize a proprietary protocol of the processor's manufacturer. Further, if the entire processor is compromised, rekeying the integrated memory controller does not adequately address the security lapse, as any new and/or additional encryption keys will already be compromised via the larger processor.

Accordingly, as discussed herein, systems and methods are provided for using an external memory controller (i.e., external to a processor) to encrypt and decrypt data stored in, and read from, memory. To accomplish this, an external key management system is used to securely generate and transmit encryption keys to the external memory controller, and the external memory controller may be configured via known and common protocols that are not specific to any processor manufacturer.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details, known to those of ordinary skill in the art, may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

FIG. 1 shows a diagram of node, in accordance with one or more embodiments of the invention. In one or more embodiments of the invention, a node (e.g., node (100)) is a computing device. In one or more embodiments, a computing device is hardware that includes one or more processor(s) (e.g., processor(s) (110)), memory (volatile and/or non-volatile) (e.g., memory (120)), persistent storage, internal physical interface(s) (e.g., serial advanced technology attachment (SATA) ports, peripheral component interconnect (PCI) ports, M.2 ports, etc.), external physical interface(s) (e.g., universal serial bus (USB) ports, recommended standard (RS) serial ports, audio/visual ports, etc.), communication interface(s) (e.g., network ports, small form-factor pluggable (SFP) ports, wireless network devices, etc.), input and output device(s) (e.g., human interface devices), or any combination thereof. Further, in one or more embodiments, the persistent storage (and/or memory (120)) of the computing device may store computer instructions (e.g., computer code) which, when executed by the processor(s) of the computing device (e.g., as software), cause the computing device to perform one or more processes specified in the computer instructions. Non-limiting examples of a computing device include a network device (e.g., switch, router, multi-layer switch, etc.), a server (e.g., a blade-server in a blade-server chassis, a rack server in a rack, etc.), a personal computer (e.g., desktop, laptop, tablet, smart phone, personal digital assistant), and/or any other type of computing device with the aforementioned capabilities. In one or more embodiments of the invention, a node (100) may include a software layer (102) and a hardware layer (108), described below.

In one or more embodiments of the invention, a software layer (e.g., software layer (102)) is a collection of software components (e.g., sets of instructions) executing on one or more processor(s) (110). The software layer (102) may include a user space (103), an operating system (104), and/or a basic input/output system (BIOS) (106). Each of these components is described below.

In one or more embodiments of the invention, user space (103) is a software environment executing on a node (100) that generally provides a virtual space in which user-initiated software executes (e.g., programs, applications, etc.). In one or more embodiments of the invention, user space (103) does not have direct access to underlying hardware components of the node (100) (i.e., those hardware layer (108)). Instead, software executing in user space (103) must provide commands and/or requests to the operating system (104) and/or the BIOS (106) which, in turn, coordinates the exchange of information between user space (103) software and hardware layer (108) components.

In one or more embodiments of the invention, operating system (104) is software executing on the node (100). In one or more embodiments of the invention, the operating system (104) allows for the creation of user space (103) and generally provides a virtual space in which user-initiated software executes. In one embodiment of the invention, an operating system (104) coordinates operations between software executing in user space (103) and the BIOS (106) to facilitate the proper use of the components of the hardware layer (108) (e.g., processor(s) (110), memory (120)). In one embodiment of the invention, operating system (104) does not have direct access to underlying hardware components (e.g., those of hardware layer (108)). Instead, the operating system software must provide commands and/or requests to the BIOS (106) which, in turn, coordinates the exchange of information between hardware components and the operating system (104).

In one or more embodiments of the invention, a basic input/output system (BIOS) (106) is firmware executing on the node (100) used to initialize hardware components (e.g., processor(s) (110), memory (120)) prior to the operating system (104) initializing. In one or more embodiments of the invention, the BIOS (106) may be a unified extensible firmware interface (UEFI) or similar firmware for initializing hardware. The BIOS (106) may coordinate operations between software executing in operating system (104) and the hardware layer (108) to facilitate the proper use of that hardware. Specifically, the BIOS (106) may be firmware that interacts with a baseboard management controller (BMC) (e.g., BMC (112)).

In one or more embodiments of the invention, the BIOS (106) may be executing a memory controller interface (107) that is used to interact (i.e., exchange information) with one or more external memory controller(s). In one or more embodiments, a memory controller interface (107) may take the form of an application programming interface (API), a general user interface (GUI), and/or an advanced configuration and power interface (ACPI). In one or more embodiments of the invention, the memory controller interface (107) is capable of receiving commands (e.g., from the BIOS (106) via an API, from a user via a GUI/ACPI, etc.) and modifying one or more properties of the memory controller via a shared memory controller table (e.g., a proximity domain (_PXM) table).

In one or more embodiments of the invention, the memory controller interface (107) allows the BIOS (106), operating system (104), or other components of the node to query the external memory controller (116) and retrieve information about the external memory controller (116), generally. Further, the memory controller interface (107) and the shared memory controller table(s) thereof, allow for the BIOS (106) to identify existing memory regions (122) and send request to the external memory controller (116) to generate new memory regions (122), reallocate old memory regions (122), etc.

In one or more embodiments of the invention, the memory controller interface (107) may be an API (without a graphical component) that allows for querying for available information and sending commands to configure modifiable settings of the external memory controller (116). In one or more embodiments of the invention, the memory controller interface (107) may have a graphical component (e.g., a GUI or ACPI to be displayed on a computer monitor connected to the node) that includes a display of all of the information of the memory controller (116) properties. A graphical component may exist with or without an API.

In one or more embodiments of the invention, a hardware layer (108) is a collection of physical components configured to perform the operations of the node (100) and/or otherwise execute the software of the node (100) (e.g., user space (103), operating system (104), BIOS (106)). The hardware layer (108) may include one or more processor(s) (110), a baseboard management controller (BMC) (112), a key management system (KMS) (114), an external memory controller (116), a system management bus (SMBus) (118), and memory (120). Each of these components is described below.

In one or more embodiments of the invention, a baseboard management controller (BMC) (112) is a computing device (including its own processor (not shown), memory (not shown), and executes its own operating system (not shown)) that performs operations related to system management (e.g., of other components of hardware layer (108)) and/or monitors the status (e.g., "health") of other hardware components. Further, the BMC (112) may be configured to communicate with other hardware components (e.g., processor(s) (110), external memory controller (116)) via one or more communication interfaces and protocols. As an example, BMC (112) may communicate via the SMBus (118) and/or processor (110) using their corresponding protocols.

In one or more embodiments of the invention, a key management system (KMS) (114) is a component that is configured to generate, store, and provide encryption keys to other hardware layer (108) components. As a non-limiting example, for one or more memory region(s) (122), the KMS (114) may include one or more public keys and/or corresponding private keys (i.e., "encryption keys") which may be used to match with corresponding public keys and/or private keys of a memory region (122). Additionally, the KMS (114) may act as a root certificate authority that may generate certificates that certify the authenticity of one or more memory region(s) (122). Further, in one or more embodiments of the invention, the KMS (114) may provide public and/or private keys to the external memory controller (116) so that the external memory controller (116) may independently manage the encryption and decryption of one or more memory region(s) (122).

In one or more embodiments of the invention, a system management bus (SMBus) (118) is a system used for sending and receiving data relating to the management of hardware layer (108) devices. In one or more embodiments of the invention, an SMBus (118) allows for communication via an interface and protocol (e.g., inter-integrated circuit ($I^2C$)) that is commonly recognized by the devices utilizing the SMBus (118). Additionally, the protocol used to communicate over the SMBus (118) may allow for only specific types of data and configurations, thereby eliminating potential security concerns as it would be difficult to initiate malicious actions using only those specific types of allowable data.

In one or more embodiments of the invention, memory (120) is one or more hardware devices capable of storing digital information (e.g., data) in a non-transitory medium. In one or more embodiments, when accessing memory (120), software (e.g., executing in software layer (102)) may be capable of reading and writing data at the smallest units of data normally accessible (e.g., "bytes"). Specifically, in one or more embodiments, memory (120) may include a unique physical address for each byte stored thereon, thereby enabling software to access and manipulate data stored in memory (120) by directing commands to a physical address of memory (120) that is associated with a byte of data (e.g., via a virtual-to-physical address mapping). Accordingly, in one or more embodiments, software is able to perform direct, "byte-level" manipulation of data stored in memory (unlike, for example, data stored on traditional persistent storage devices, which must first be copied in "blocks" to other, intermediary storage mediums prior to reading and/or manipulating data located thereon).

Accordingly, as used herein, "memory", "memory device", "memory storage", and "memory storage device" refer to hardware storage devices that are capable of being accessed and/or manipulated at a "byte-level" regardless of whether that device is volatile, non-volatile, persistent, non-persistent, sequential access, random access, solid-state, or disk based. Non-limiting examples of memory devices include, but are not limited to, certain integrated circuit storage (e.g., flash memory, random access memory (RAM), dynamic RAM (DRAM), static RAM (SRAM), resistive RAM (ReRAM), etc.). Further, hybrid devices that include two or more forms of storage (e.g., a non-volatile dual in-line memory module (NVDIMM)) may be considered "memory" if the hybrid device component that interacts with the node (100) is capable of being accessed and/or manipulated at a "byte-level". For example, a "persistent memory" (PMem) module that includes a combination of DRAM, flash memory, and a capacitor (used, in the event of power loss, to persist DRAM data to flash memory) is considered "memory" because the DRAM component (the component of the module accessible by the node (100)) is capable of being accessed and/or manipulated at a "byte-level".

In one or more embodiments of the invention, a memory region (122) (e.g., memory region A (122A), memory region B (122B)) is one or more bytes of memory (120) that are logically grouped. A memory region (122) may be defined by the physical location(s) that comprise the memory region (122) (e.g., an address range, or series of address ranges). Accordingly, a single memory device (120) may be divided into multiple smaller memory regions (122) that allow for the larger memory (120) to be utilized by multiple processes executing in the software layer (102) and multiple cores of a processor (110) without overlapping use of the same address/bytes of the memory (120) device. Further for any memory region (122) with an accompanying physical address range, a virtual address range may also be generated. In turn, the virtual address range may be provided to a software entity, where that software entity will address commands to the memory (120) using those virtual addresses.

In one or more embodiments, a processor (110) is an integrated circuit for processing instructions (e.g., those of software layer (102) and/or those received via a communication interface (not shown)). In one embodiment, a processor (110) may be one or more processor cores or processor micro-cores. In one or more embodiments of the invention, a processor (110) may include an integrated memory controller (111), described below.

In one or more embodiments of the invention, a memory controller (e.g., integrated memory controller (111), external memory controller (116)), is hardware configured to translate virtual memory addresses to physical memory addresses (e.g., those of memory (120)). A memory controller may further be configured to protect memory (120) (and the memory regions (122) thereof) by restricting access to memory regions (122) to the processor cores affined to those memory regions (122). Further, in one or more embodiments of the invention, a memory controller may include a translation lookaside buffer (TLB) (not shown) that is capable of storing digital information (e.g., data) in a non-transitory medium. Specifically, in one embodiment of the invention, the TLB stores one or more virtual-to-physical address mappings which the memory controller may access to perform address translation.

In one or more embodiments of the invention, a memory controller may further provide encryption and decryption capabilities to data written to memory (120). A memory controller may generate (or retrieve), store, and assign encryption keys (public and private keys) that are used to encrypt data when written to memory (120) and decrypt (encrypted) data when read from memory (120). Accordingly, a memory controller may include one or more circuits or execute higher-level processes to perform the encryption and decryption of the data.

In one or more embodiments of the invention, an integrated memory controller (111) is a memory controller physically embedded within a processor (110). Further, an integrated memory controller (111) may be impractical to separate from the processor (110) due to their concurrent construction and entangled circuitry within a single integrated circuit. An integrated memory controller (111) may be built to include a finite number of encryption keys that maybe assigned to various memory regions. A processor (110) may be configured to allow for the reconfiguration of an integrated memory controller (111) (e.g., resetting encryption keys, generating new encryption keys, etc.). However, the configuration (via processor (110)) may not utilize a common, known, or open protocol, but instead may utilize a proprietary protocol specific to the processor (110) (or processor's manufacturer).

In one or more embodiments of the invention, an external memory controller (116) is a memory controller that exists separate from a processor (110) (although the two may be operatively connected through the node (100)). In one or more embodiments of the invention, an external memory controller (116) includes a keystore (not shown) that is used to store one or more encryptions keys retrieved from the KMS (114). Further, an external memory controller (116) may generate an association table (not shown) that associated each memory region (122) (managed by the external memory controller (116)) with one or more processor (110) core(s), an encryption key, and/or a decryption key.

In one or more embodiments of the invention, an external memory controller (116) may be reconfigured without interaction of a processor (110) and may further independently communicate with other components of the hardware layer (108). In one or more embodiments of the invention, the external memory controller (116) may retrieve encryption keys from a KMS (114), communicate with the BMC (112), and interact with a processor (110) using one or more path(s) of communication. As a non-limiting example, the BMC (112) may communicate with an external memory controller (116) via the SMBus (118) (e.g., via "sideband" communication), and/or the BMC (112) may communicate with external memory controller (116) via the processor (110) using "vendor defined messages" (VDMs). Accordingly, an external memory controller (116) has multiple means for communication with other hardware layer (108) components, where the means for communication are platform agnostic and may be available in nodes with varying configurations.

While FIG. 1 shows a specific configuration of a system, other configurations may be used without departing from the scope of the invention. Accordingly, embodiments disclosed herein should not be limited to the configuration of devices and/or components shown in FIG. 1.

Figure 2:
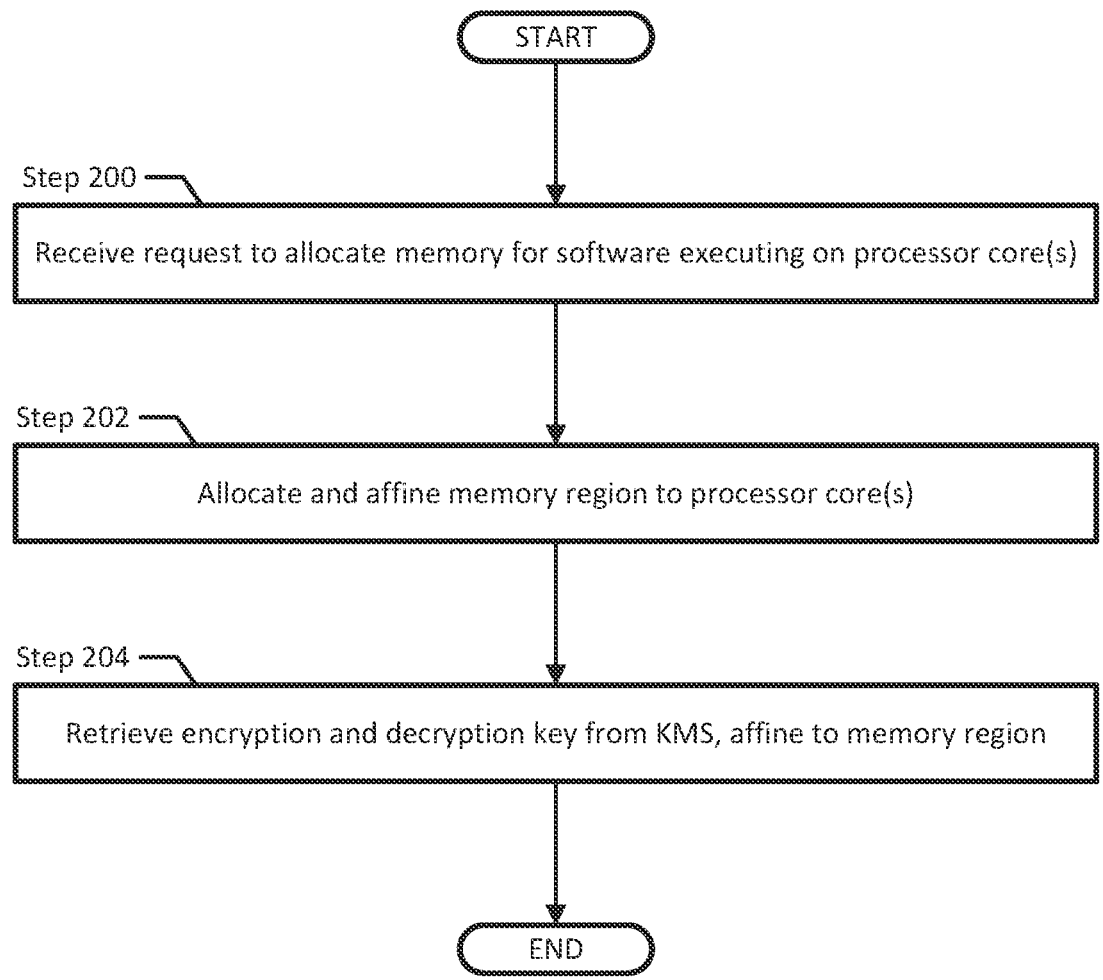
FIG. 2 shows a flowchart of a method of allocating a memory region, in accordance with one or more embodiments of the invention.

FIG. 2 shows a flowchart of a method of allocating a memory region, in accordance with one or more embodiments of the invention. All or a portion of the method shown in FIG. 2 may be performed by one or more components of the external memory controller. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 200, the external memory controller receives a request to allocate memory for software executing on one or more processor core(s) (i.e., an allocation request). The request to allocate memory may include a minimum size of memory that is needed to be allocated to the software (e.g., 5 Mb, 1 GB, etc.). The request to allocate memory may be generated by the software due to the software initializing and requesting resources required to operate, or the software may request the allocation of memory because additional resources are needed to continue to perform the operations of the software. In one or more embodiments of the invention, the request to allocate a memory may be received via the memory controller interface of the BIOS.

In Step 202, the external memory controller allocates free memory into a memory region at the specified size (or above). Further, the external memory controller creates a new association entry in the association table for the newly created memory region. In the association entry, a unique identifier for the memory region (i.e., a memory region unique identifier) is stored along with a unique identifier for the processor core(s) (i.e., a processor core unique identifier) that requested the allocation (at Step 200).

In Step 204, the external memory controller receives an encryption and decryption key from the KMS and stores it in the keystore of the external memory controller. The encryption and decryption keys are received after the external memory controller requests a set of keys from the KMS using one or more protocols of the node. In one or more embodiments of the invention, the external memory controller preemptively requests and stores multiple encryption and decryption keys (in the keystore) so that a request does not have to be made to the KMS each time a new memory region is allocated. Once received, the external memory controller adds the encryption and decryption keys (or unique identifiers of the keys) to the association entry (created in Step 202). The external memory controller may then inform the processor core(s) that memory has been allocated into the memory region. This information may be provided to the processor core(s) (and/or the software executing thereon) via the memory controller interface. Accordingly, after Step 204, a new memory region has been successfully generated and that memory region is affined to one or more processor core(s) and uniquely associated with an encryption and decryption key. The process may end following Step 204.

Figure 3:
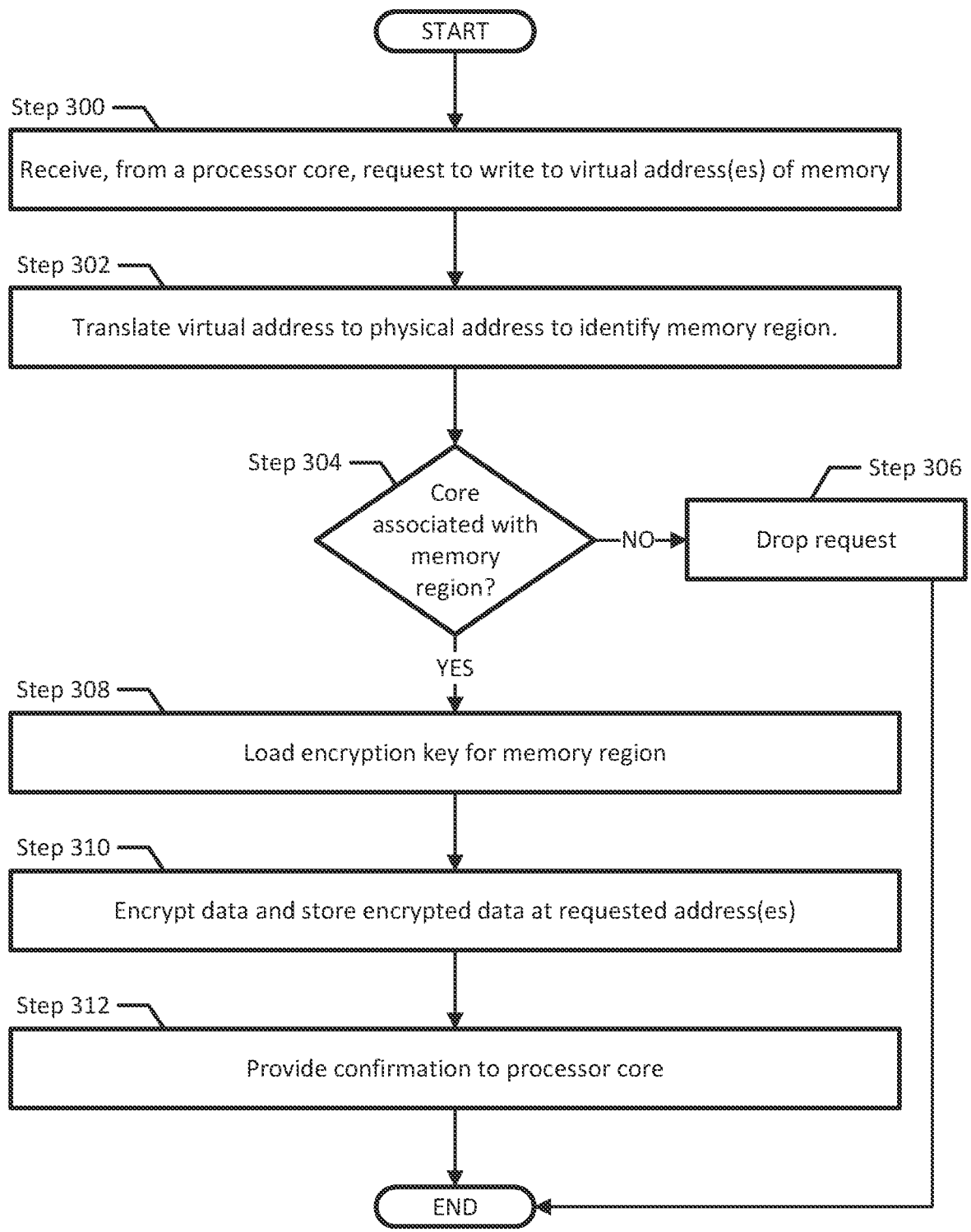
FIG. 3 shows a flowchart of a method of writing to a memory region, in accordance with one or more embodiments of the invention.

FIG. 3 shows a flowchart of a method of writing to a memory region, in accordance with one or more embodiments of the invention. All or a portion of the method shown in FIG. 3 may be performed by one or more components of the external memory controller. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 300, the external memory controller receives a request to write data to memory. The write request includes the data to be written as well as one or more virtual address(es) at which to begin writing the data. In one or more embodiments of the invention, the write request may be received as a scheduled workload.

In Step 302, the external memory controller translates the virtual address(es) received in the write request (at Step 300) into the physical address(es) of the memory device. Once the physical address(es) are known, the external memory controller identifies the memory region to which the write request is directed.

In Step 304, the external memory controller performs a lookup in the association table to determine if the processor core that sent the write request is associated with (i.e., affined to) the identified memory region. To accomplish this, the external memory controller identifies the association entry that includes the memory region unique identifier associated with the identified memory region, then the external memory controller determines if the processor core(s) identified in that association entry match the processor core that sent the write request. If the processor core is affined to the memory region (Step 304—YES), the method proceeds to Step 308. However, if the processor core is not affined to the memory region (Step 304—NO), the method proceeds to Step 306.

In Step 306, the external memory controller drops (e.g., ignores, blocks, rejects, etc.) the write request. The external memory controller may perform no additional actions on the write request, or the external memory controller may inform the processor core (and/or the software executing thereon) that the write request was rejected.

In Step 308, the external memory controller loads the encryption key associated with the identified memory region. The encryption key may be loaded from the association entry for the identified memory region, or the encryption key may be loaded from the keystore, as identified by the association entry.

In Step 310, the external memory controller encrypts the data provided in the write request (at Step 300) using the encryption key and stores the encrypted data at the physical address(es) (translated at Step 302). In Step 312, the external memory controller provides a confirmation to the processor core (or the software executing thereon) that the write request was successfully completed. This information may be provided to the processor core(s) (and/or the software executing thereon) via the memory controller interface. The process may end following Step 312.

Figure 4:
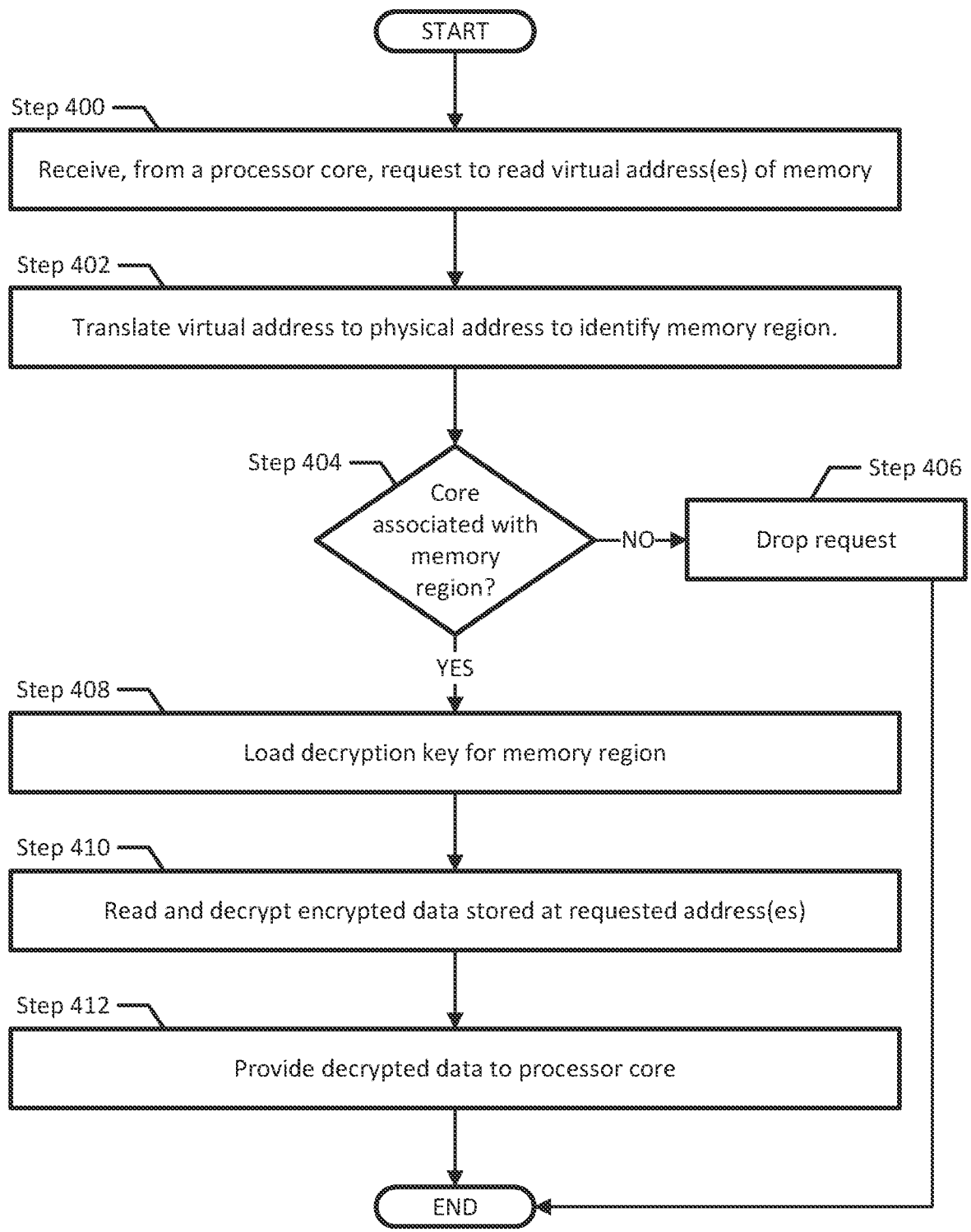
FIG. 4 shows a flowchart of a method of reading from a memory region, in accordance with one or more embodiments of the invention.

FIG. 4 shows a flowchart of a method of reading from a memory region, in accordance with one or more embodiments of the invention. All or a portion of the method shown in FIG. 4 may be performed by one or more components of the external memory controller. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 400, the external memory controller receives a request to read data from memory. The read request includes one or more virtual address(es) at which to begin writing the data and a length (e.g., size) of the region to be read. In one or more embodiments of the invention, the read request may be received as a scheduled workload.

In Step 402, the external memory controller translates the virtual address(es) received in the read request (at Step 400) into the physical address(es) of the memory device. Once the physical address(es) are known, the external memory controller identifies the memory region to which the read request is directed.

In Step 404, the external memory controller performs a lookup in the association table to determine if the processor core that sent the read request is associated with (i.e., affined to) the identified memory region. To accomplish this, the external memory controller identifies the association entry that includes the memory region unique identifier associated with the identified memory region, then the external memory controller determines if the processor core(s) identified in that association entry match the processor core that sent the read request. If the processor core is affined to the memory region (Step 404—YES), the method proceeds to Step 408. However, if the processor core is not affined to the memory region (Step 404—NO), the method proceeds to Step 406.

In Step 406, the external memory controller drops (e.g., ignores, blocks, rejects, etc.) the read request. The external memory controller may perform no additional actions on the read request, or the external memory controller may inform the processor core (and/or the software executing thereon) that the read request was rejected.

In Step 408, the external memory controller loads the decryption key associated with the identified memory region. The decryption key may be loaded from the association entry for the identified memory region, or the decryption key may be loaded from the keystore, as identified by the association entry.

In Step 410, the external memory controller reads the encrypted data from the physical address(es) (translated at Step 402) and decrypts the data using the decryption key. In Step 412, the external memory controller provides the decrypted data to the processor core (and/or the software executing thereon). The process may end following Step 412.

What is claimed is:

1. A method for securing memory via an external memory controller, comprising:
    receiving, by the external memory controller, an allocation request to allocate a memory region from a processor core of a processor, wherein the allocation request comprises at least a minimum size of memory needed to be allocated to the processor core, wherein the processor comprises an internal memory controller, and wherein the external memory controller is located outside the processor; and
    in response to receiving the allocation request:
        allocating, by the external memory controller, the memory region from the memory, wherein the memory region is at least the minimum size of memory;
        associating, by the external memory controller, the processor core with the memory region; and
        associating, by the external memory controller, an encryption key and a decryption key with the memory region.

2. The method of claim 1, wherein after associating the processor core with the memory region, the method further comprises:
    receiving a write request from a second processor core, wherein the write request comprises a virtual address;
    translating the virtual address into a physical address;
    identifying the memory region, based on the physical address;
    making a determination that the processor core is not associated with the memory region; and
    in response to the determination:
        dropping the write request.

3. The method of claim 1, wherein associating the processor core with the memory region comprises:
    generating an association entry, in an association table, comprising a memory region unique identifier and a processor core unique identifier.

4. The method of claim 3, wherein associating the encryption key and the decryption key with the memory region comprises:
    adding, to the association entry, the encryption key and the decryption key.

5. The method of claim 4, wherein prior to adding the encryption key and the decryption key to the association entry, the method further comprises:
    obtaining, from a key management system, the encryption key and the decryption key via a system management bus.

6. The method of claim 3, wherein after associating the processor core with the memory region, the method further comprises:
    receiving a write request from the processor core, wherein the write request comprises a virtual address and unencrypted data;
    translating the virtual address into a physical address;
    identifying the memory region, based on the physical address;
    making a determination that the processor core is associated with the memory region; and
    in response to the determination:
        loading the encryption key;
        encrypting the unencrypted data to obtain encrypted data; and
        storing the encrypted data at the physical address.

7. The method of claim 6, wherein making the determination that the processor core is associated with the memory region comprises:
- identifying, in the association table, the association entry based on the memory region unique identifier; and
- identifying, in the association entry, the processor core unique identifier.

8. A non-transitory computer readable medium comprising instructions which, when executed by a computer processor, enables the computer processor to perform a method for securing memory via an external memory controller, comprising:
- receiving, by the external memory controller, an allocation request to allocate a memory region from a processor core of a processor, wherein the allocation request comprises at least a minimum size of memory needed to be allocated to the processor core, wherein the processor comprises an internal memory controller, and wherein the external memory controller is located outside the processor; and
- in response to receiving the allocation request:
  - allocating, by the external memory controller, the memory region from the memory, wherein the memory region is at least the minimum size of memory;
  - associating, by the external memory controller, the processor core with the memory region; and
  - associating, by the external memory controller, an encryption key and a decryption key with the memory region.

9. The non-transitory computer readable medium of claim 8, wherein after associating the processor core with the memory region, the method further comprises:
- receiving a write request from a second processor core, wherein the write request comprises a virtual address;
- translating the virtual address into a physical address;
- identifying the memory region, based on the physical address;
- making a determination that the processor core is not associated with the memory region; and
- in response to the determination:
  - dropping the write request.

10. The non-transitory computer readable medium of claim 8, wherein associating the processor core with the memory region comprises:
- generating an association entry, in an association table, comprising a memory region unique identifier and a processor core unique identifier.

11. The non-transitory computer readable medium of claim 10, wherein associating the encryption key and the decryption key with the memory region comprises:
- adding, to the association entry, the encryption key and the decryption key.

12. The non-transitory computer readable medium of claim 11, wherein prior to adding the encryption key and the decryption key to the association entry, the method further comprises:
- obtaining, from a key management system, the encryption key and the decryption key via a system management bus.

13. The non-transitory computer readable medium of claim 10, wherein after associating the processor core with the memory region, the method further comprises:
- receiving a write request from the processor core, wherein the write request comprises a virtual address and unencrypted data;
- translating the virtual address into a physical address;
- identifying the memory region, based on the physical address;
- making a determination that the processor core is associated with the memory region; and
- in response to the determination:
  - loading the encryption key;
  - encrypting the unencrypted data to obtain encrypted data; and
  - storing the encrypted data at the physical address.

14. The non-transitory computer readable medium of claim 13, wherein making the determination that the processor core is associated with the memory region comprises:
- identifying, in the association table, the association entry based on the memory region unique identifier; and
- identifying, in the association entry, the processor core unique identifier.

15. A node, comprising:
- a processor comprising a processor core and an internal memory controller;
- memory; and
- an external memory controller, wherein the external memory controller is located outside the processor and wherein the external memory controller is configured to perform a method for securing the memory, comprising:
  - receiving an allocation request to allocate a memory region from the processor core, wherein the allocation request comprises at least a minimum size of memory needed to be allocated to the processor core; and
  - in response to receiving the allocation request:
    - allocating the memory region from the memory, wherein the memory region is at least the minimum size of memory;
    - associating the processor core with the memory region; and
    - associating an encryption key and a decryption key with the memory region.

16. The node of claim 15, wherein associating the processor core with the memory region comprises:
- generating an association entry, in an association table, comprising a memory region unique identifier and a processor core unique identifier.

17. The node of claim 16, wherein associating the encryption key and the decryption key with the memory region comprises:
- adding, to the association entry, the encryption key and the decryption key.

18. The node of claim 17, wherein prior to adding the encryption key and the decryption key to the association entry, the method further comprises:
- obtaining, from a key management system, the encryption key and the decryption key via a system management bus.

19. The node of claim 18, wherein after associating the processor core with the memory region, the method further comprises:
- receiving a write request from the processor core, wherein the write request comprises a virtual address and unencrypted data;
- translating the virtual address into a physical address;
- identifying the memory region, based on the physical address;
- making a determination that the processor core is associated with the memory region; and in response to the determination:
   loading the encryption key;
   encrypting the unencrypted data to obtain encrypted data; and
   storing the encrypted data at the physical address.

20. The node of claim 19, wherein making the determination that the processor core is associated with the memory region comprises:
   identifying, in the association table, the association entry based on the memory region unique identifier; and
   identifying, in the association entry, the processor core unique identifier.

\* \* \* \* \*